(12) United States Patent
Pan et al.

(10) Patent No.: US 6,785,329 B1
(45) Date of Patent: Aug. 31, 2004

(54) AUTOMATIC VIDEO OBJECT EXTRACTION

(75) Inventors: Jinhui Pan, Beijing (CN); Shipeng Li, Princeton, NJ (US); Ya-Qin Zhang, West Windsor, NJ (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/468,985

(22) Filed: Dec. 21, 1999

(51) Int. Cl.[7] .............................. H04N 7/32; H04B 1/66
(52) U.S. Cl. ................................................. 375/240.08
(58) Field of Search ....................... 375/240.01, 240.24, 375/240.25, 240.26, 240.27, 240.29; 382/103, 233, 164; 348/413.1, 416.1, 414.1, 699; 345/419; H04N 7/32; H04B 1/66

(56) References Cited

U.S. PATENT DOCUMENTS

| | | | | |
|---|---|---|---|---|
| 5,479,218 A | * | 12/1995 | Etoh | 348/699 |
| 5,608,458 A | * | 3/1997 | Chen et al. | 348/413 |
| 5,936,671 A | * | 8/1999 | Van Beek et al. | 348/413 |
| 5,995,668 A | * | 11/1999 | Corset et al. | 382/233 |
| 6,005,625 A | * | 12/1999 | Yokoyama | 348/416 |
| 6,035,060 A | * | 3/2000 | Chen et al. | 382/164 |
| 6,075,875 A | * | 6/2000 | Gu | 382/107 |
| 6,141,434 A | * | 10/2000 | Christian et al. | 382/103 |
| 6,266,443 B1 | * | 7/2001 | Vetro et al. | 382/199 |
| 6,337,917 B1 | * | 1/2002 | Onural et al. | 382/107 |
| 6,348,918 B1 | * | 2/2002 | Szeliski et al. | 345/419 |
| 6,400,846 B1 | * | 6/2002 | Lin et al. | 382/199 |
| 6,421,090 B1 | * | 7/2002 | Jiang et al. | 348/452 |
| 6,625,333 B1 | * | 9/2003 | Wang et al. | 382/300 |

FOREIGN PATENT DOCUMENTS

WO     WO 98/33323     *  7/1998  ............ H04N/7/32

OTHER PUBLICATIONS

Gu & Lee, Tracking of Multiple Semantic Video Objects for Internet Applications, IS&T/SPIE Conference on Visual Communications & Image Processing '99, SPIE vol. 3563, pp. 806–820, 1/99.

Alatan, Onural, Wolburn et al., Image Sequence Analysis for Emerging Interaction Multimedia Services, IEEE Transactions on Circuits and Systems for Video Technology, vol. 8, No. 7, 11/98.

* cited by examiner

Primary Examiner—Tung T. Vo
(74) Attorney, Agent, or Firm—Lee & Hayes, PLLC (57) ABSTRACT

Automatic video object extraction that defines substantially precise objects is disclosed. In one embodiment, color segmentation and motion segmentation are performed on a source video. The color segmentation segments the video by substantially uniform color regions thereof. The motion segmentation segments the video by moving regions thereof. The color regions and the moving regions are then combined to define the video objects. In varying embodiments, pre-processing and post-processing is performed to further clean the source video and the video objects defined, respectively.

31 Claims, 7 Drawing Sheets

AUTOMATIC VIDEO OBJECT EXTRACTION

FIELD OF THE INVENTION

This invention relates generally to the extraction of objects from source video, and more particularly to such extraction that is substantially automatic in nature.

BACKGROUND OF THE INVENTION

An increasingly common use of computers and computerized devices is the processing of video, such as video captured in real-time, or video captured or otherwise input from a storage, such as a hard disk drive, a digital video disc (DVD), a video cassette recorder (VCR) tape, etc. For the processing of video, objects within the video usually need to be extracted. Objects can correspond to, for example, semantic objects, which are objects as defined perceptually by the viewer. For example, a video of a baseball game may have as its objects the various players on the field, the baseball after it is thrown or hit, etc. Object extraction is useful for object-based coding techniques, such as MPEG-4, as known within the art; for content-based visual database query and indexing applications, such as MPEG-7, as also known within the art; for the processing of objects in video sequences; etc.

Prior art object extraction techniques generally fall into one of two categories: automatic extraction and semi-automatic extraction. Automatic extraction is relatively easy for the end user to perform, since he or she needs to provide little or no input for the objects to be extracted. Automatic extraction is also useful in real-time processing of video, where user input cannot be feasibly provided in real time. The primary disadvantage to automatic extraction, however, is that as performed within the prior art the objects are not defined precisely. That is, only rough contours of objects are identified. For example, parts of the background may be included in the definition of a given object.

Conversely, semi-automatic object extraction from video requires user input. Such user input can provide the exact contours of objects, for example, so that the objects are defined more precisely as compared to prior art automatic object extraction. The disadvantage to semi-automatic extraction, however, is that user input is in fact necessary. For the lay user, this may be at best inconvenient, and at most infeasible in the case where the user is not proficient in video applications and does not know how to provide the necessary optimal input. Furthermore, semi-automatic extraction is ill-suited for real-time processing of video, even where a user is proficient, since typically the user cannot identify objects in real time.

Therefore, there is a need to combine the advantages of automatic and semi-automatic video object extraction techniques. That is, there is a need to combine the advantageous precise definitions afforded objects by semi-automatic techniques, with the advantageous ability to perform the object extraction in real-time, as is allowed with automatic techniques. For these and other reasons, there is a need for the present invention.

SUMMARY OF THE INVENTION

The invention relates to automatic video object extraction. In one embodiment, color segmentation and motion segmentation are performed on a source video. The color segmentation segments the video by substantially uniform color regions thereof. The motion segmentation segments the video by moving regions thereof The color regions and the moving regions, referred to as masks in one embodiment of the invention, are then combined to define the video objects.

Embodiments of the invention provide for advantages not found within the prior art. Specifically, at least some embodiments of the invention provide for object extraction from video in a substantially automatic manner, while resulting in objects that are substantially precisely defined. The motion segmentation mask defines the basic contours of the objects, while the color segmentation mask provides for more precise boundaries of these basic contours. Thus, combined, the motion and color segmentation masks allow for video object extraction that is substantially automatic, but which still yields substantially precisely defined objects.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
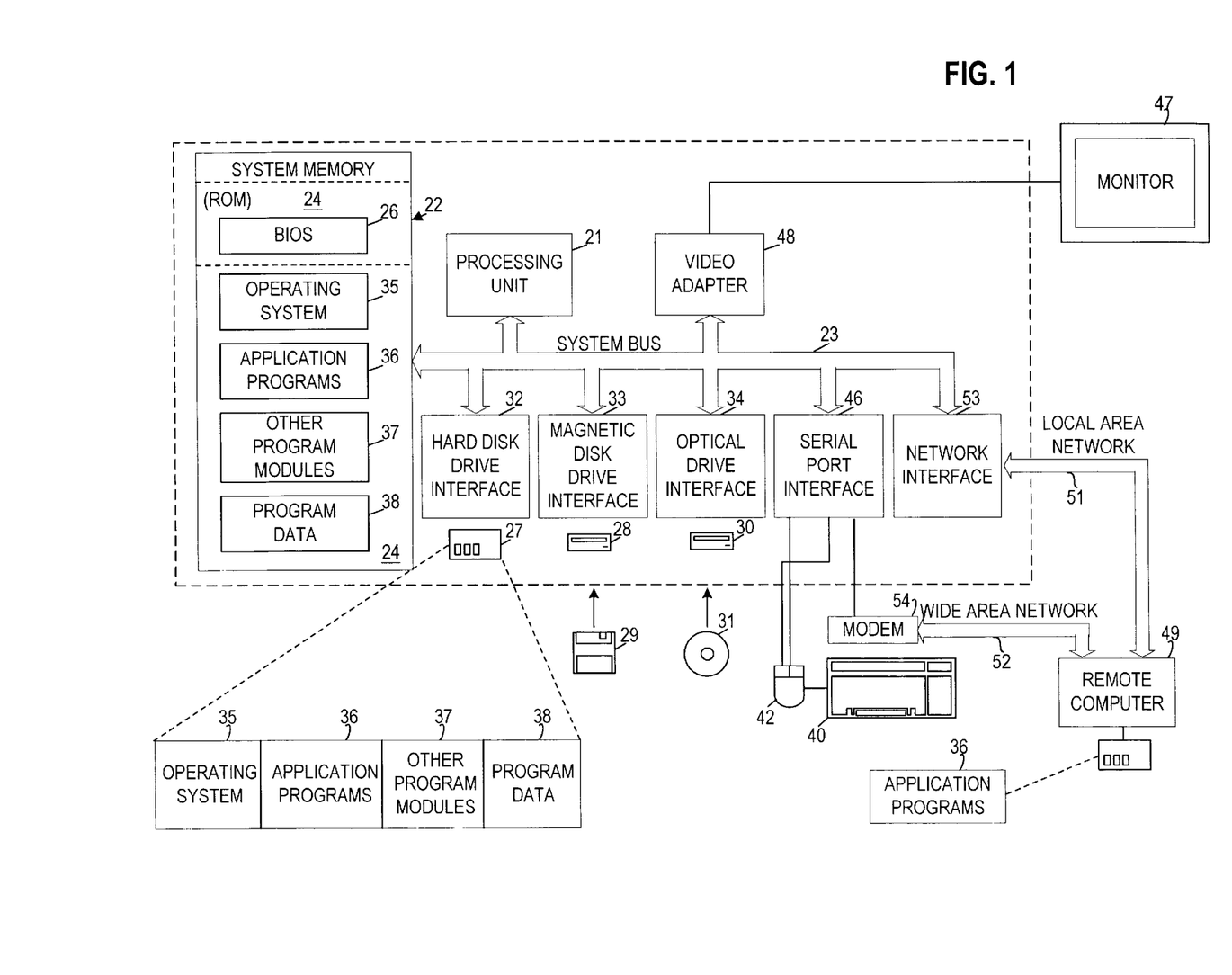
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, ASICs (Application Specific Integrated Circuits), and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, video camera, or the like. These and other input devices are often connected to the processing unit 21 through a serial port interface 46 that is coupled to the system bus, but may be connected by other interfaces, such as a parallel port, game port, an IEEE 1394 port (also known as FireWire), or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview

In this section of the detailed description, an overview of object extraction, such as can be performed by embodiments of the invention, is provided. The objects extracted in at least some embodiments of the invention are semantic objects. Semantic objects represent meaningful entities in a source video, from a perceptual standpoint of users.

Figure 2:
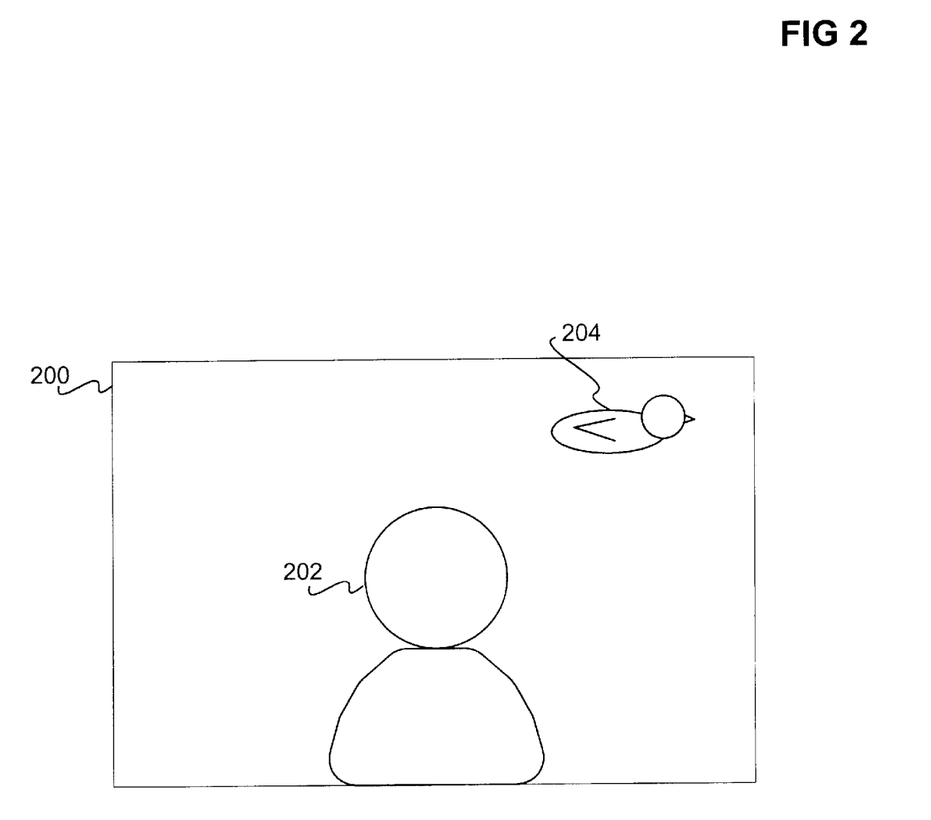
FIG. 2 is a diagram of a frame of a representative source video in conjunction with which embodiments of the invention can be practiced.

For example, in the diagram of FIG. 2, within the source video 200 are shown two objects, a person 200, and a bird 204. Applying video object extraction in accordance with embodiments of the invention yields separation of the person 200 and the bird 204 from the source video 200 in such a manner that the boundaries of the objects are defined at least substantially precisely, against any other objects within the video 200 and the background of the video 200.

Figure 3:
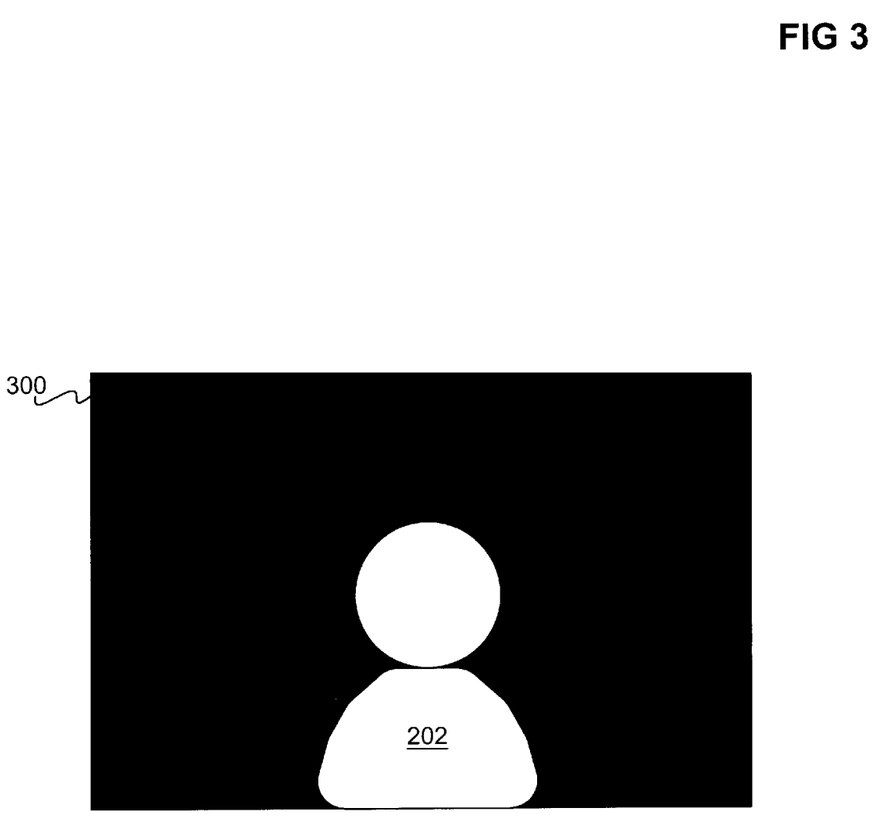
FIG. 3 is a diagram of a first object extracted from the representative source video of FIG. 2.
Figure 4:
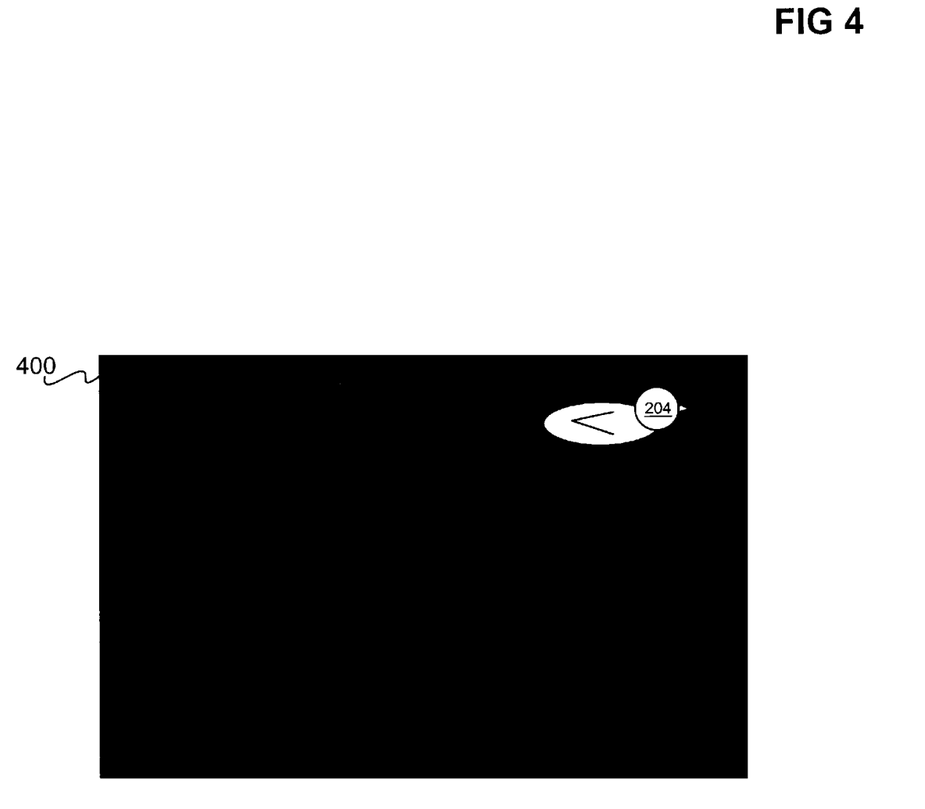
FIG. 4 is a diagram of a second object extracted from the representative source video of FIG. 2.

Thus, applying embodiments of the invention to perform object extraction on the source video 200 of FIG. 2 yields the person 202 by itself, as shown in the frame 300 of the diagram of FIG. 3, and the bird 204 by itself, as shown in the frame 400 of the diagram of FIG. 4. Those of ordinary skill within the art can appreciate, however, that the overview presented in this section in conjunction with FIGS. 2 4 is for example and illustration purposes only, and that the invention itself is not limited to the example provided herein.

Color Segmentation

In this section of the detailed description, color segmentation as performed in accordance with an embodiment of the invention is described. The color segmentation in one embodiment is performed on a frame of a source video, to segment the video by substantially uniform color regions thereof. That is, a color segmentation mask is generated that defines substantially precise boundaries of the objects extracted from the source video. Those of ordinary skill within the art can appreciate that many techniques exist within the prior art to perform color segmentation, such as edge detection, region techniques, Maximum A posteriori Probability (MAP) techniques, etc., and that the invention itself is not limited to a particular technique. The embodiment of the invention described herein utilizes a technique that extends and is based on the technique described in the reference Chuang Gu and Ming-Chieh Lee, Tracking of Multiple Semantic Video Objects for Internet Applications, SPIE, Visual Communications and Image Processing 1999, volume 3653, as known within the art.

Figure 5:
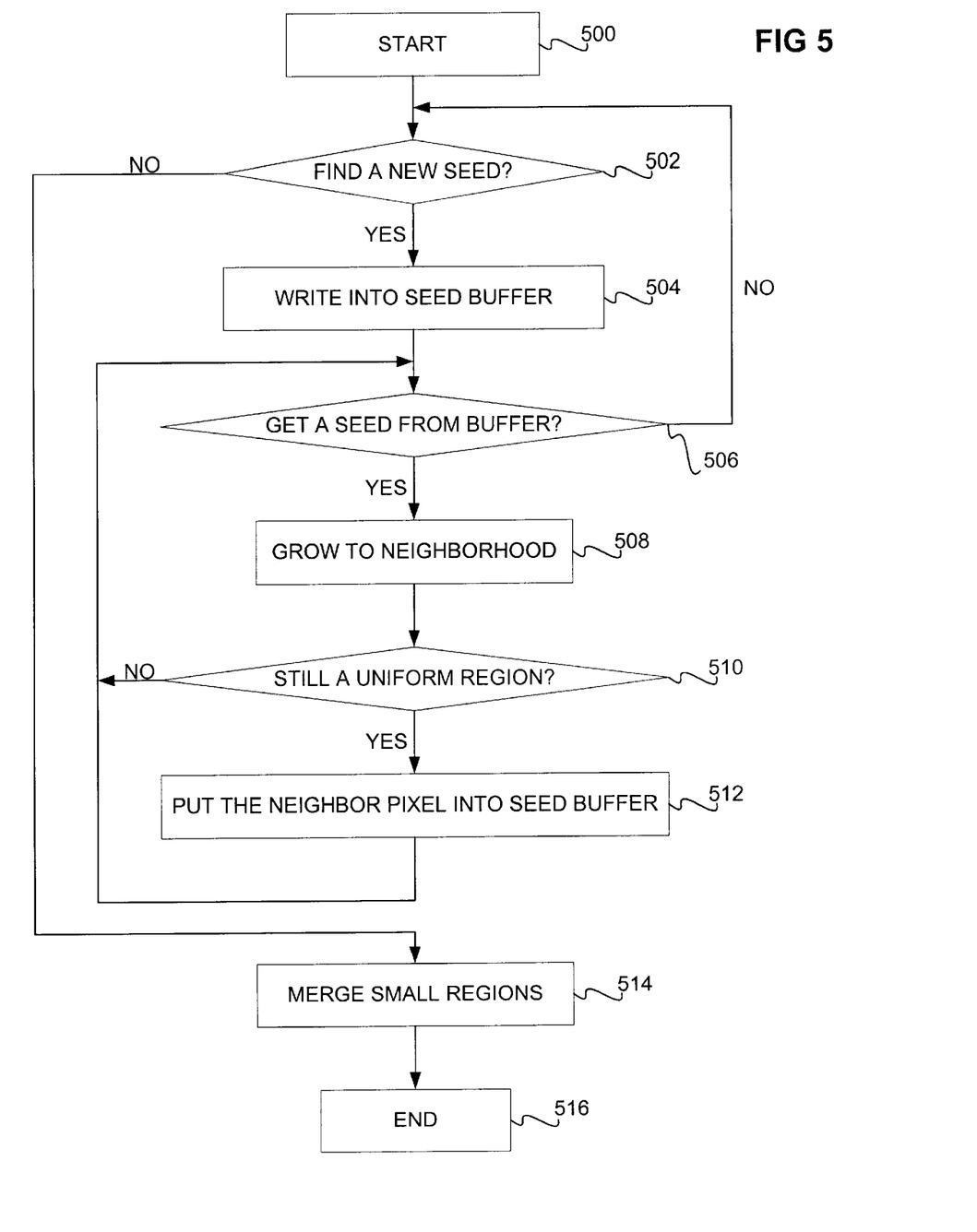
FIG. 5 is a flowchart of a method to perform color segmentation according to one embodiment of the invention.

Referring to FIG. 5, a flowchart of a method to perform color segmentation according to an embodiment of the invention, extending and based on the reference identified in the previous paragraph, is shown. From the start in 500, the method proceeds to 502, where the method determines a seed pixel of a frame of a source video. Initially, a seed can be chosen to be the upper-left corner pixel in a rectangular frame. After that, a seed is randomly chosen from the region(s) have not been included in any segmented regions. If no seed pixels are left, then the method proceeds to 514. Otherwise the method puts the seed into a seed buffer in 504. A seed pixel is then obtained from the buffer in 506, unless there are no seeds left in the buffer, in which case the method proceeds back to 502.

In 508, the seed pixel is grown by a neighbor pixel or a neighborhood of pixels. The seed pixel is grown by a neighborhood of pixels surrounding the pixel as governed by the constraint that a substantially homogenous color region is to be generated. In one embodiment, the homogeneity of a region is controlled by the difference of the maximum and minimum values within a region. For example, for a color image, the value of a pixel in one embodiment is a vector including the red, green and blue color channels in the form $\{r, g, b\}$. Thus, the maximum and minimum values of a region are $\{\max\{r\}, \max\{g\}, \max\{b\}\}$, and $\{\min\{r\}, \min\{g\}, \min\{b\}\}$, respectively. If the difference of the maximum and minimum values of a region does not exceed a predetermined threshold, then it is deemed a uniform region.

Therefore, in 510, after the region has been grown in 508, it is determined whether the region is still of substantially uniform color. If not, then the method proceeds back to 506, to obtain a new seed from the buffer, and to start the process of obtaining substantially uniform color regions over again. Otherwise, the neighboring pixel or pixels of the seed pixel is placed into the seed buffer in 512, to continue growing the same substantially uniform color region by also proceeding back to 506. The same substantially uniform color region is continued to be grown by virtue of the fact that the neighboring pixel or pixels of the seed pixel have been placed into the seed buffer in 512.

Once all the substantially uniform color regions have been determined, and there are no seeds left in the buffer, nor can further seeds be found within the frame of the source video, then the method proceeds from 502 to 514. In 514, smaller substantially uniform color regions are merged into larger substantially uniform color regions. This merging removes relatively smaller regions by integrating them into relatively larger regions. In one embodiment, this is accomplished by merging all the regions with the number of pixels less than a certain threshold (<10 pixels) to its neighbor regions. The method then ends in 516.

As has been noted, color segmentation can be performed on one or more frames of the source video. The invention is not limited, however, by the manner which is followed to select the frame that will ultimately be used as the color segmentation mask. In one embodiment, the frame is selected by the user, either before or after color segmentation has been performed (i.e., the user selects a frame on which color segmentation is performed, or color segmentation is performed on a number of frames, and the user selects one of these frames). In another embodiment, the frame is predetermined. For example, for off-line processing of captured video, the first frame may be always selected. As another example, for real-time processing of video, the last frame may always be selected.

Motion Segmentation and Combination of Multiple Frames

In this section of the detailed description, motion segmentation as performed in accordance with an embodiment of the invention is described, as well as the combination of multiple frames for such motion segmentation to generate a cleaner motion segmentation mask. The motion segmentation in one embodiment is performed on a plurality of frames of a source video, such as two frames, as will be described, although the invention itself is not so limited. Those of ordinary skill within the art can appreciate that many techniques exist within the prior art to perform motion segmentation, such as optical flow techniques, block-based matching techniques, Maximum A posteriori Probability (MAP) techniques, simultaneous motion estimation and segmentation techniques, etc., and that the invention itself is not limited to a particular technique. The motion segmentation segments a source video by moving regions thereof, and defines approximate boundaries of objects extracted from the source video.

In one embodiment, motion segmentation is obtained as follows. First, a motion vector is first obtained by region matching. For each uniform region generated from the color segmentation described in the preceding paragraph, prior to combining the smaller regions with the larger regions, a motion vector is obtained by determining the best match in a next frame of the source video. This is particularly described in the reference noted in the preceding section of the detailed description. This region-based motion estimation technique substantially ensures that each color-segmented region has the same motion vector.

In one embodiment, the matching window is set to a sixteen-by-sixteen pixel window, and the matching criterion is to determine the least matching error of the region. The matching error is defined as:

$$ERROR(n, i) = \sum_{p \in R_n} \|I_t(p) - I_{t+1}(p + V_{(n,i)})\|$$

ERROR(n, i) is the matching error for region n with motion vector V_(n, i). I_t and I_t+1 represent the current and next frame, respectively. R_n denotes region n. Operator ||*|| denotes the sum of absolute difference between two vectors. Finally, V_(n, i)<=V_max, where V_max is the searching range. The motion vector of region n is defined as:

$$V(n) = \underset{V_{(n,i)}}{\operatorname{argmin}} ERROR(n, i)$$

After obtaining a motion vector for each region, a motion mask can then be obtained:

$$V(i, j) = V(n), (i, j) \in \text{Region } n$$
$$\|V(i, j)\| = |V_x(i, j)| + |V_y(i, j)|$$
$$M(i, j) = \begin{cases} 1 & \text{if } \|V(i, j)\| \geq T1 \\ 0 & \text{otherwise} \end{cases}$$

V(i, j) is the motion vector of pixel (i, j), and V_x(i,j) and V_y(i,j) are the projection of V(i, j) on the x and y coordinates, respectively. M(i, j) represents each pixel in the motion mask, where T1 is the predetermined threshold set according to the motion. In one embodiment, T1 is set to one for slow motion, and to anywhere from two to three for fast motion.

In one embodiment, the frame interval is adapted according to the estimated motion. Most motion estimation is based on two continuous frames. However, this is not always valid in some sequences, where the motion of moving objects is minimal, and leads to a sparse motion field. Therefore, the interval of two frames is adapted. For a fast motion field, the interval can be set small, while for slow motion, the interval can be set large.

In one embodiment, multiple frames are combined to decrease errors associated with the assignment of regions incorrectly assigned to a moving object due to noise. In other words, the incorrect motion caused by random noise is removed by checking multiple motion masks to generate the final motion mask, since random noise will not be constant across multiple frames. Furthermore, the uncovered background can be distinguished from true moving regions.

This combination of multiple frames is accomplished in one embodiment as follows. First, the frequency of a pixel is assigned to a moving object in a number of motion masks, such as ten or more. If the frequency is higher than a predetermined threshold, then this pixel is determined as a moving pixel. Otherwise, it is designated as background and is removed from the final motion mask. In one embodiment, the threshold is fifty percent. Thus, $$C(i, j) = \sum_{s=1}^{S} M_s(i, j)$$

$$M(i, j) = \begin{cases} 1 & \text{if } C(i, j)/S > T2 \\ 0 & \text{otherwise} \end{cases}$$

M_s(i,j) represents each motion mask being combined, S denotes the number of total motion masks used in combination, C(i,j) denotes the total number of times pixel (i,j) is assigned as a moving pixel in S motion masks, and T2 is the threshold.

Methods

In this section of the detailed description, methods according to varying embodiments of the invention are described. The description is made with reference to FIG. 6, which is a flowchart of a computer-implemented method according to one embodiment of the invention. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 6:
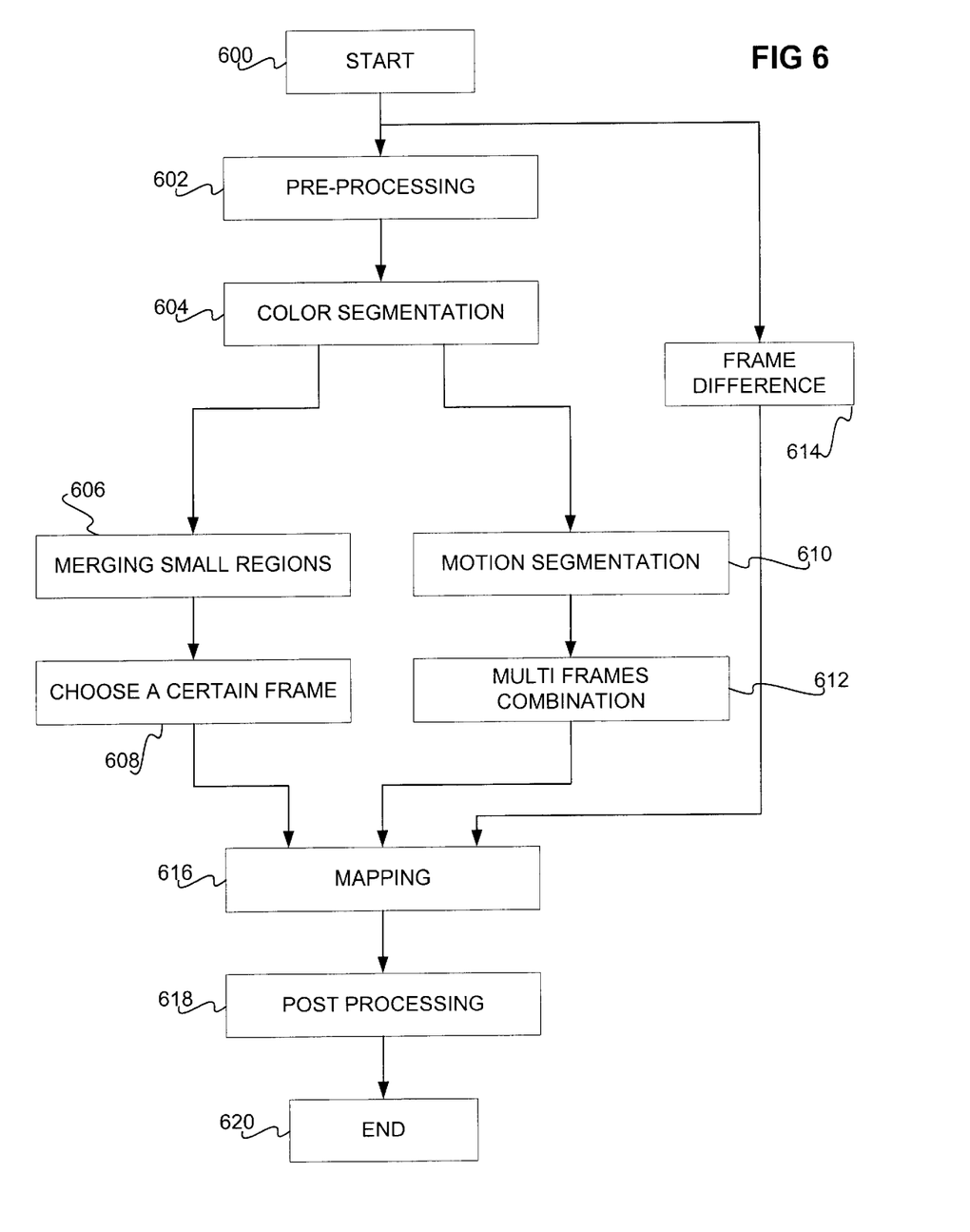
FIG. 6 is a flowchart of a method according to one embodiment of the invention; and, FIG. 7 is a diagram of a system according to one embodiment of the invention.

Referring to FIG. 6, from the start of the method in 600, the method proceeds to 602, in which in one embodiment pre-processing of a source video from which objects are to be extracted is accomplished. Pre-processing is performed in one embodiment to remove noise from the source video prior to performing color segmentation. In one embodiment, a median filter is used on each of the red, green and blue color channels of the source video, or one or more frames thereof. Pre-processing is not necessary for the invention, however.

Next, in 604, color segmentation is performed. Color segmentation can be accomplished in one embodiment as described in a preceding section of the detailed description, although the invention is not so limited. The resulting mask of the color segmentation is then optimized in one embodiment by merging smaller regions into larger regions in 606, and such that a certain frame of the color segmented source video is selected in 608, as has also been described in a preceding section of the detailed description. The final color segmentation mask is then used as input in 616.

In the embodiment of FIG. 6, the color segmentation mask resulting from 604 is used as the basis for motion segmentation in 610, to generate a motion segmentation mask, as described in the preceding section of the detailed description. However, the invention does not require the motion segmentation mask to be generated from the color segmentation mask. In one embodiment, the mask is optimized by combining multiple-frame masks in 612, as also described in the preceding section of the detailed description. However, the invention is not limited to motion segmentation as described in the preceding section. The final motion segmentation mask is then used as input in 616.

In 614, a third mask used as input in 616 is generated, which is referred to as a frame difference mask. In one embodiment, the frame difference mask is generated from two successive frames of the source video, and is generated to provide for correction of errors that may result from the motion segmentation mask. The difference mask is obtained in one embodiment as follows:

$$D(i, j) = |I_t(i, j) - I_{t+m}(i, j)|$$

$$DM(i, j) = \begin{cases} 1 & \text{if } D(i, j) > T4 \\ 0 & \text{otherwise} \end{cases}$$

The difference mask is DM(i, j), where I_x represents frame x, and T4 is a predetermined threshold, such as ten to twenty pixels.

In 616, the resulting color segmentation, motion segmentation, and frame difference masks are combined to define the objects of the source video in an automatic and substantially precise manner. In one embodiment, the median result of color segmentation and motion segmentation is first determined. The frame difference mask is then combined with this median result to generate the final mask which defines the objects of the source video.

Thus, while color segmentation identifies the exact edges of objects, it typically results in over segmentation. Furthermore, while motion segmentation generates a coarse mask of moving objects, the boundaries identified are too rough to provide for exact object extraction. Therefore, the color segmentation and motion segmentation masks are combined, to extract moving objects with substantially pixel-wise accuracy.

In one embodiment, this initial combination of motion and color segmentation masks is accomplished by a mapping operation. For each region generated by color segmentation, the corresponding region is found in the motion segmentation mask. If the percent of the region that is assigned to a moving object exceeds a predetermined threshold, then the whole region is deemed to be part of the moving object. In one embodiment, this threshold is between fifty and sixty percent.

Thus, $$B(N) = \sum_{(i,j) \in N} M(i, j)$$

$$J(N) = \begin{cases} 1 & \text{if } B(N)/A(N) > T3 \\ 0 & \text{otherwise} \end{cases}$$

$$FM(i, j) = J(N) \quad \text{if } (i, j) \in N$$

N represents the color segmented region, A(N) is the area of region N, M(i, j) is the pixel in the combined motion mask, and FM(I, j) is the pixel in the final mapped mask. T3 is the threshold.

The combined motion and color segmentation mask is then combined with the frame difference mask, as follows:

$$B(N) = \sum_{(i,j) \in N} DM(i, j)$$

$$J(N) = \begin{cases} 1 & \text{if } B(N)/A(N) > T3 \\ 0 & \text{otherwise} \end{cases}$$

$$FD(i, j) = J(N) \quad \text{if } (i, j) \in N$$

$$F(i, j) = \begin{cases} 1 & \text{if } FM(i, j) = 1 \text{ and } FD(i, j) = 1 \\ 0 & \text{otherwise} \end{cases}$$

F(i, j) is the final mask in which the color segmentation, motion segmentation, and frame-difference masks have been combined. FD(i, j) is the frame-difference mask such that the mask has been mapped in the same manner as FM(i, j) has been mapped, so that the two can be compared to generate F(i, j).

As can be appreciated by those of ordinary skill within the art, the frame-difference mask, while providing for more precise automatic extraction of video objects, is not required in one embodiment of the invention. Thus, in one embodiment, F(i, j) can be obtained simply by setting it equal to FM(i, j), which is the interim result of combining the color and the motion segmentation masks. That is, combining the moving regions resulting from the motion segmentation and the substantially uniform color regions resulting from the color segmentation can be used in one embodiment to define the objects of the source video.

Furthermore, other masks can be introduced into 616 in addition to and/or in lieu of any of the color segmentation, motion segmentation, and frame difference masks. Such masks can include a depth mask, providing for information relating to the depth of the objects of the source video, a texture mask, providing for information relating to the texture of the objects of the source video, etc. In such embodiments, all of the masks to be used are combined to generate the final mask that identifies the objects extracted from the source video.

Next, in one embodiment, post-processing of the mask generated in 616 is performed in 618, for example, to remove noise from the mask. Post-processing can include in one embodiment removing small holes from the objects identified to generate integrated objects, and can in another embodiment also include removing small regions from background areas of the source video to generate cleaner objects. In one embodiment, this is accomplished by first merging smaller regions with larger regions, as described in a preceding section of the detailed description in the context of color segmentation. Then, a morphological operator(s), such as open and/or close, as known within the art, is applied. However, as can be appreciated by those of ordinary skill within the art, post-processing is not required by the invention itself. The method of FIG. 6 finally ends at 620.

Systems and Computers

In this section of the detailed description, systems and computers according to varying embodiments of the invention are described. The description is made with reference to FIG. 7, which is a diagram of a computer 699 according to an embodiment of the invention. The computer 699 can, for example, correspond to the computer described in conjunction with FIG. 1 in a preceding section of the detailed description. The computer 699 includes a processor 700, a computer-readable medium 702, and a source 704 from which the source video from which objects are to be extracted is obtained. The medium 702 can include non-volatile memory, storage devices such as hard disk drives, as well as volatile memory such as types of random-access memory (RAM).

Figure 7:
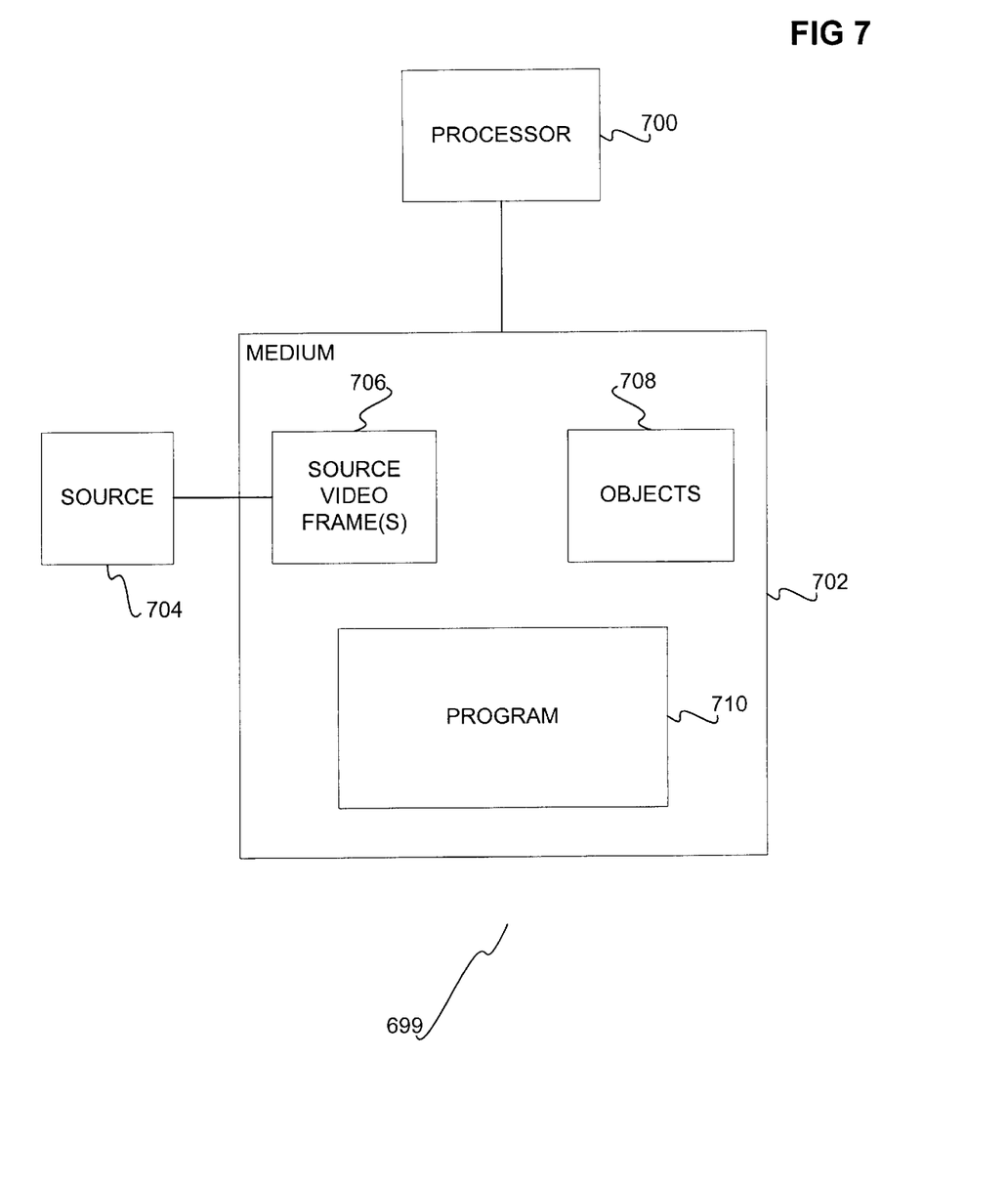

The medium 702 stores data representing at least one frame 706 of the source video, which itself has a number of frames, and is obtained from the source 704, such as a video camera, a video cassette recorder (VCR) tape, a digital video disc (DVD), etc. The medium 702 also stores data representing the objects 708 extracted from the source video. The medium 702 can in one embodiment correspond to a means for storing data representing the frame(s) 706 and the objects 708. The objects are extracted by a computer program 710, which is executed by the processor 700 from the medium 702.

The program 710 is thus designed to extract the objects 708 from the video by generating and then combining a number of masks from the video, in one embodiment, as has been described in preceding sections of the detailed description. In one embodiment, the program 710 can correspond to a means for generating and combining the masks. These masks can include a color segmentation mask, a motion segmentation mask, a frame difference mask, a texture mask, and/or a depth mask, as has been described in the preceding section of the detailed description. The color mask can be used to define substantially precise boundaries of the objects, the motion segmentation mask to define approximate boundaries, and the frame difference mask to correct errors within the motion segmentation mask.

Furthermore, the program 710 can either pre-process one or more frames of the source video to remove noise, post-process the objects extracted in the finally generated mask to remove noise, or both, although the invention is not so limited. Pre-processing and post-processing can be performed as has been described in the preceding section of the detailed description. In one embodiment, the program 710 also corresponds to the means for pre-processing and/or post-processing.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer implemented method for extracting objects from a source video comprising:
    performing color segmentation on a frame of the source video to segment the video to a first precision by substantially uniform color regions thereof;
    performing motion segmentation on a plurality of frames of the source video to segment the video to a second precision by moving regions thereof; and,
    combining at least the moving regions resulting from the motion segmentation and the substantially uniform color regions resulting from the color segmentation to define the objects of the source video to a third precision;
    wherein the third precision is greater than the first precision, and the first precision is greater than the second precision.

2. The method of claim 1, further comprising pre processing the frame of the source video to remove noise prior to performing color segmentation.

3. The method of claim 2, wherein pre processing the frame comprises applying a median filter on each of a plurality of color channels of the frame.

4. The method of claim 1, further comprising, prior to combining at least the moving regions and the substantially uniform color regions, generating a frame difference mask from two frames of the source video.

5. The method of claim 1, wherein the performing motion segmentation comprises performing motion segmentation on the at least three frames of the plurality of frames of the source video to produce at least two motion segmentation masks that are used to segment the video by moving regions thereof.

6. The method of claim 1, further comprising post processing the objects of the source video to remove noise from the objects.

7. The method of claim 6, wherein post processing the objects comprises removing small holes from the objects to generate integrated objects.

8. The method of claim 6, wherein post processing the objects comprises removing small regions from background areas of the source video to generate cleaner objects.

9. The method of claim 1, wherein performing color segmentation defines substantially precise boundaries of the objects extracted from the source video.

10. The method of claim 1, wherein performing color segmentation comprises growing the substantially uniform color regions by growing each of a plurality of seed pixels of the frame.

11. The method of claim 10, wherein performing color segmentation comprises merging smaller of the substantially uniform color regions with larger of the substantially uniform color regions.

12. The method of claim 1, wherein performing motion segmentation defines approximate boundaries of the objects extracted from the source video.

13. At least one machine readable medium having instructions stored thereon for execution by a processor to perform a method comprising:
    performing color segmentation on at least one frame of a plurality of frames of video to segment the video to a first precision by substantially uniform color regions;
    performing motion segmentation on at least two frames of the plurality of frames of the video to segment the video to a second precision by moving regions; and,
    combining the substantially uniform color regions resulting from the color segmentation and the moving regions resulting from the motion segmentation to define objects of the video to a third precision;
    wherein the third precision is greater than the first precision, and the first precision is greater than the second precision.

14. The at least one machine readable medium of claim 13, wherein the performing color segmentation comprises at least one of edge detection, a region technique, a Maximum A posteriori Probability (MAP) technique, and pixel growth.

15. The at least one machine readable medium of claim 13, wherein the performing color segmentation comprises obtaining a seed pixel and using the seed pixel to grow a neighborhood of pixels.

16. The at least one machine readable medium of claim 13, wherein the performing color segmentation comprises generating substantially homogenous color regions responsive to maximum and minimum values for the regions.

17. The at least one machine readable medium of claim 13, wherein the performing color segmentation comprises generating substantially homogenous color regions responsive to maximum and minimum values for the regions and at least one predetermined threshold.

18. The at least one machine readable medium of claim 13, wherein the performing color segmentation comprises merging relatively smaller color regions by integrating the relatively smaller color regions into relatively larger color regions.

19. The at least one machine readable medium of claims 13, wherein the performing motion segmentation comprises at least one of an optical flow technique, a block-based matching technique, a Maximum A posteriori Probability (MAP) technique, a simultaneous motion estimation and segmentation technique, and a region-based motion vector approach.

20. The at least one machine readable medium of claim 13, wherein the performing motion segmentation comprises determining motion vectors for a plurality of regions with respect to a first frame and a subsequent frame of the plurality of frames of the video.

21. The at least one machine readable medium of claim 20, wherein the motion vectors are determined with regard to the substantially uniform color regions resulting from the color segmentation or to a precursor of the substantially uniform color regions.

22. The at least one machine readable medium of claim 13, wherein the performing motion segmentation comprises (i) determining motion vectors for a plurality of regions using a matching error minimization technique and (ii) determining a motion mask using the motion vectors and at least one threshold.

23. The at least one machine readable medium of claim 13, wherein the performing color segmentation comprises determining at least one color segmentation mask and the performing motion segmentation comprises determining at least one motion segmentation mask.

24. The at least one machine readable medium of claim 13, wherein the combining the substantially uniform color regions and the moving regions comprises performing a mapping operation using the substantially uniform color regions and the moving regions.

25. The at least one machine readable medium of claim 24, wherein the performing the mapping operation comprises mapping an entirety of a particular substantially uniform color region to a particular moving region if a percentage of the particular substantially uniform color region that is assignable to the particular moving region exceeds a predetermined threshold.

26. The at least one machine readable medium of claim 13, wherein the method further comprises performing a frame difference operation to produce a frame difference mask that reflects an amount of difference between a first frame and a subsequent frame of the plurality of frames of the video.

27. The at least one machine readable medium of claim 26, wherein the combining the substantially uniform color regions and the moving regions comprises combining the substantially uniform color regions, the moving regions, and the frame difference mask to define the objects of the video.

28. The at least one machine readable medium of claim 13, wherein the combining the substantially uniform color regions and the moving regions comprises combining (i) the substantially uniform color regions, (ii) the moving regions, and (iii) one or more of a frame difference mask, a depth mask, and a texture mask to define the objects of the video.

29. The at least one machine readable medium of claim 13, wherein the method further comprises:

pre-processing the video prior to the performing color segmentation; and post-processing the objects of the video.

30. At least one machine readable medium having instructions stored thereon for execution by a processor to perform a method comprising:

generating a color segmentation mask that defines contours of objects of a video to a first precision based on colors of the video;

generating a motion segmentation mask that defines the contours of the objects of the video to a second precision based on motions of the video;

generating a frame difference mask that reflects differences in the video between a first frame and a second frame of the video; and combining the color segmentation mask, the motion segmentation mask, and the frame difference mask to define the objects of the video;

wherein the combining defines the objects of the video to a third precision; and wherein the third precision is greater than the first precision, and the first precision is greater than the second precision.

31. At least one machine readable medium comprising:

means for performing color segmentation on at least one frame of a plurality of frames of video to segment the video by substantially uniform color regions to a middle precision;

means for performing motion segmentation on at least two frames of the plurality of frames of the video to segment the video by moving regions to a precision that is lower than the middle precision; and, means for combining the substantially uniform color regions produced by the means for performing color segmentation and the moving regions produced by the means for performing motion segmentation to define objects of the video to another precision that is greater than the middle precision.

* * * * *